US009632785B2

United States Patent
Blomgren et al.

(10) Patent No.: US 9,632,785 B2
(45) Date of Patent: *Apr. 25, 2017

(54) INSTRUCTION SOURCE SPECIFICATION

(71) Applicant: Apple Inc., Cupertino, CA (US)

(72) Inventors: James S. Blomgren, Austin, TX (US); Terence M. Potter, Austin, TX (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/233,496

(22) Filed: Aug. 10, 2016

(65) Prior Publication Data

US 2016/0350113 A1 Dec. 1, 2016

Related U.S. Application Data

(63) Continuation of application No. 13/956,291, filed on Jul. 31, 2013, now Pat. No. 9,442,730.

(51) Int. Cl.
G06F 9/00 (2006.01)
G06F 9/30 (2006.01)
G06F 9/34 (2006.01)
G06F 9/38 (2006.01)

(52) U.S. Cl.
CPC ...... *G06F 9/30145* (2013.01); *G06F 9/30007* (2013.01); *G06F 9/34* (2013.01); *G06F 9/384* (2013.01); *G06F 9/3857* (2013.01)

(58) Field of Classification Search
CPC .................. G06F 9/3857; G06F 9/34
See application file for complete search history.

(56) References Cited

U.S. PATENT DOCUMENTS

| 5,568,646 A | 10/1996 | Jaggar |
| 5,958,043 A * | 9/1999 | Motomura ............ G06F 9/3838 712/216 |
| 6,675,288 B2 * | 1/2004 | Farrell .................. G06F 9/3836 712/216 |
| 2013/0086363 A1 | 4/2013 | Gschwind et al. |

OTHER PUBLICATIONS

Office Action in U.S. Appl. No. 13/956,291 mailed Nov. 23, 2015, 8 pages.

* cited by examiner

*Primary Examiner* — Zachary K Huson
(74) *Attorney, Agent, or Firm* — Meyertons, Hood, Kivlin, Kowert & Goetzel, P.C.; Michael B. Davis

(57) ABSTRACT

Techniques are disclosed relating to specification of instruction operands. In some embodiments, this may involve assigning operands to source inputs. In one embodiment, an instruction includes one or more mapping values, each of which corresponds to a source of the instruction and each of which specifies a location value. In this embodiment, the instruction includes one or more location values that are each usable to identify an operand for the instruction. In this embodiment, a method may include accessing operands using the location values and assigning accessed operands to sources using the mapping values. In one embodiment, the sources may correspond to inputs of an execution block. In one embodiment, a destination mapping value in the instruction may specify a location value that indicates a destination for storing an instruction result.

20 Claims, 8 Drawing Sheets

FIG. 2A

Instruction Format 200

| Opcode 205 | Dest 210 | Source 1 215A | Source 2 215B | ... | Source N 215N |

FIG. 2B

Instruction Format 220

| Opcode 225 | Num location values 230 | Dest mapping 235 | Source 1 mapping 240A | Source 2 mapping 240B | ... | Source N mapping 240N |

| Location value 1 250A | Location value 2 250B |

Location value M 250M

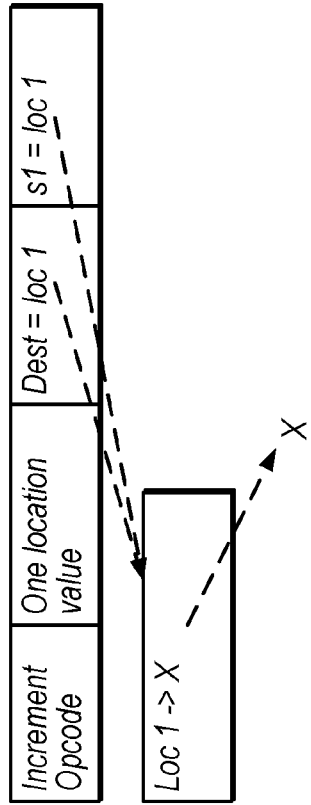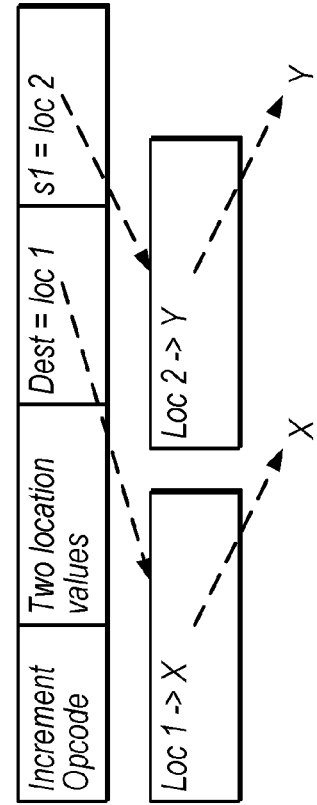
FIG. 3D
FIG. 3E

INSTRUCTION SOURCE SPECIFICATION

The present application is a continuation of U.S. application Ser. No. 13/956,291, filed Jul. 31, 2013; the disclosure of which is incorporated by reference herein in its entirety.

BACKGROUND

Technical Field

This disclosure relates generally to instruction processing and more specifically to specifying instruction operands.

Description of the Related Art

Instructions typically specify an operation to be performed with reference to one or more sources. For example, an add instruction may indicate addition of sources A and B. For some instructions, sources may share operands. For example, the add instruction may indicate addition of register r1 to register r1, in which case both sources A and B receive an operand from r1. Determining when sources share operands may consume significant power. For example, the determination may involve comparing all address bits of each operand. Operands may have fairly large addresses, especially in the context of graphics processing, for example.

SUMMARY

Techniques are disclosed relating to specification of instruction operands. In some embodiments, this may involve assigning operands to source inputs. In one embodiment, an instruction includes one or more mapping values, each of which corresponds to a source of the instruction and each of which specifies a location value. In this embodiment, the instruction includes one or more location values that are each usable to identify an operand for the instruction. In this embodiment, a method may include accessing operands using the location values and assigning accessed operands to sources using the mapping values. In one embodiment, the sources may correspond to inputs of an execution block. In one embodiment, a destination mapping value in the instruction may specify a location value that indicates a destination for storing an instruction result.

In some embodiments, instructions that include location values and mapping values may reduce or eliminate comparison circuitry for detecting operands that are shared between multiple sources. This may reduce power consumption and/or area of an execution unit in some embodiments.

BRIEF DESCRIPTION OF THE DRAWINGS

FIGS. 2A-2B are diagrams illustrating exemplary instruction formats.

FIGS. 3A-3E are diagrams illustrating exemplary instruction implementations.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

Various units, circuits, or other components may be described or claimed as "configured to" perform a task or tasks. In such contexts, "configured to" is used to connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. §112(f) for that unit/circuit/component.

DETAILED DESCRIPTION

Figure 1A:
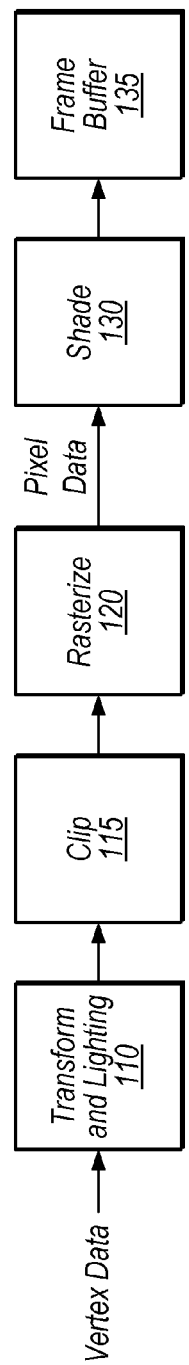
FIG. 1A is a block diagram illustrating an exemplary graphics processing flow.
Figure 1B:
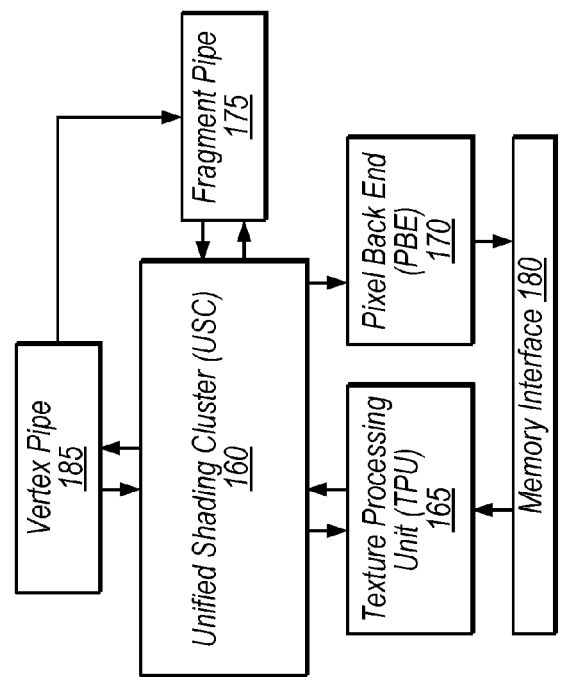
FIG. 1B is a block diagram illustrating one embodiment of a graphics unit.
Figure 1C:
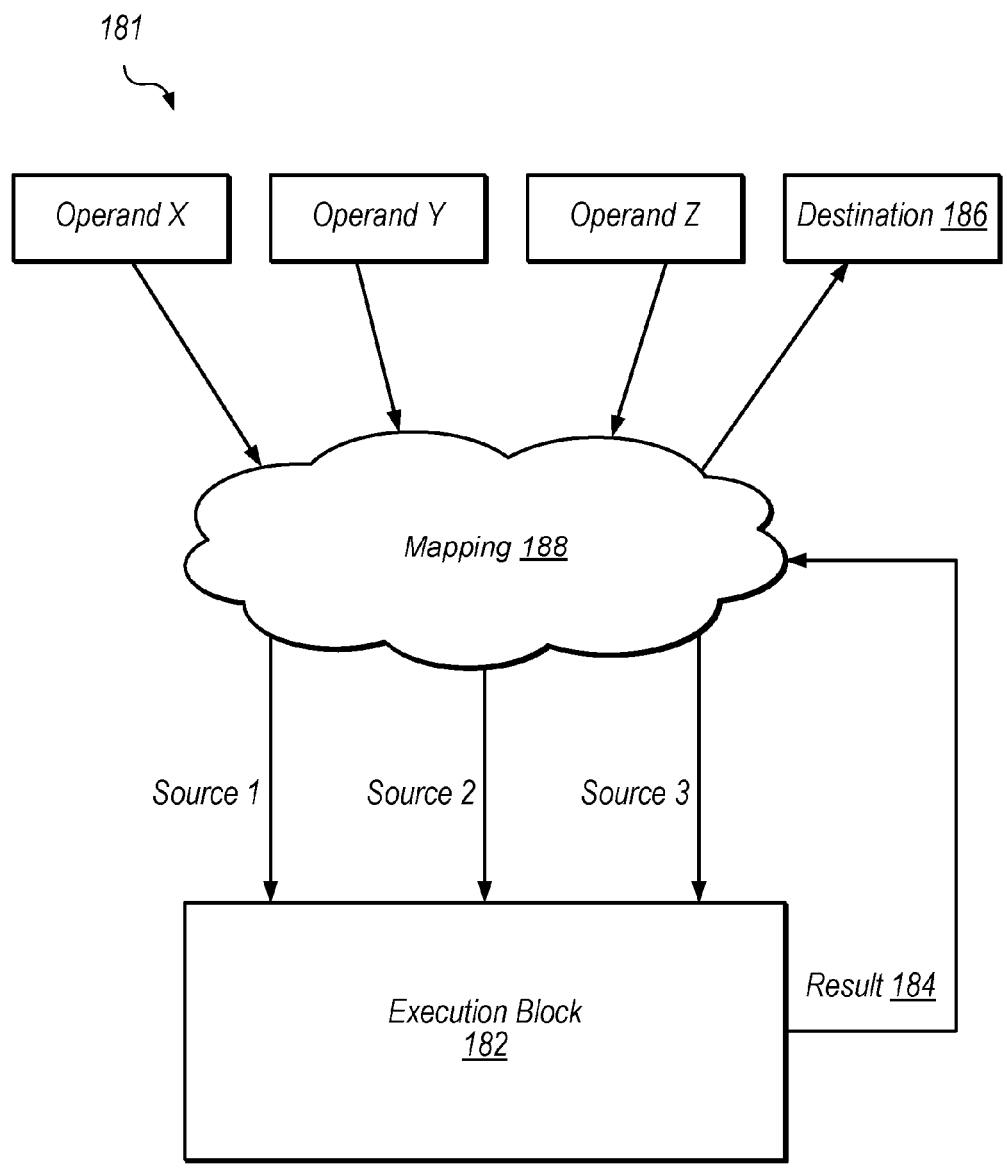
FIG. 1C is a block diagram illustrating one embodiment of an exemplary system for mapping operands to sources.

This disclosure initially describes, with reference to FIGS. 1A-C, an overview of a graphics processing flow and an exemplary graphics unit. It then describes exemplary instruction formats with reference to FIGS. 2-3E. One embodiment of a graphics pipeline for executing instructions is described with reference to FIGS. 4 and 6 and an exemplary device is described with reference to FIG. 5. In some embodiments, techniques described herein may reduce power consumption associated with accessing and/or routing instruction operands.

Referring to FIG. 1A, a flow diagram illustrating an exemplary processing flow 100 for processing graphics data is shown. In one embodiment, transform and lighting step 110 may involve processing lighting information for vertices received from an application based on defined light source locations, reflectance, etc., assembling the vertices into polygons (e.g., triangles), and/or transforming the polygons to the correct size and orientation based on position in a three-dimensional space. Clip step 115 may involve discarding polygons or vertices that fall outside of a viewable area. Rasterize step 120 may involve defining fragments or pixels within each polygon and assigning initial color values for each fragment, e.g., based on texture coordinates of the vertices of the polygon. Shade step 130 may involve altering pixel components based on lighting, shadows, bump mapping, translucency, etc. Shaded pixels may be assembled in a frame buffer 135. Modern GPUs typically include programmable shaders that allow customization of shading and other processing steps by application developers. Thus, in various embodiments, the exemplary steps of FIG. 1A may be performed in various orders, performed in parallel, or omitted, and additional processing steps may be implemented.

Referring now to FIG. 1B, a simplified block diagram illustrating one embodiment of a graphics unit 150 is shown. In the illustrated embodiment, graphics unit 150 includes unified shading cluster (USC) 160, vertex pipe 185, fragment pipe 175, texture processing unit (TPU) 165, pixel back end (PBE) 170, and memory interface 180. In one embodiment, graphics unit 150 may be configured to process both vertex and fragment data using USC 160, which may be configured to process graphics data in parallel using multiple execution pipelines or instances.

Vertex pipe 185, in the illustrated embodiment, may include various fixed-function hardware configured to process vertex data. Vertex pipe 185 may be configured to communicate with USC 160 in order to coordinate vertex processing. In the illustrated embodiment, vertex pipe 185 is configured to send processed data to fragment pipe 175 and/or USC 160 for further processing.

Fragment pipe 175, in the illustrated embodiment, may include various fixed-function hardware configured to process pixel data. Fragment pipe 175 may be configured to communicate with USC 160 in order to coordinate fragment processing. Fragment pipe 175 may be configured to perform rasterization on polygons from vertex pipe 185 and/or USC 160 to generate fragment data. Vertex pipe 185 and/or fragment pipe 175 may be coupled to memory interface 180 (coupling not shown) in order to access graphics data.

USC 160, in the illustrated embodiment, is configured to receive vertex data from vertex pipe 185 and fragment data from fragment pipe 175 and/or TPU 165. USC 160 may be configured to perform vertex processing tasks on vertex data which may include various transformations and/or adjustments of vertex data. USC 160, in the illustrated embodiment, is also configured to perform fragment processing tasks on pixel data such as texturing and shading, for example. USC 160 may include multiple execution instances for processing data in parallel. USC 160 may be referred to as "unified" in the illustrated embodiment in the sense that it is configured to process both vertex and fragment data. In other embodiments, programmable shaders may be configured to process only vertex data or only fragment data.

TPU 165, in the illustrated embodiment, is configured to schedule fragment processing tasks from USC 160. In one embodiment, TPU 165 may be configured to pre-fetch texture data and assign initial colors to fragments for further processing by USC 160 (e.g., via memory interface 180). TPU 165 may be configured to provide fragment components in normalized integer formats or floating-point formats, for example. In one embodiment, TPU 165 may be configured to provide fragments in groups of four (a "fragment quad") in a 2×2 format to be processed by a group of four execution instances in USC 160.

PBE 170, in the illustrated embodiment, is configured to store processed tiles of an image and may perform final operations to a rendered image before it is transferred to a frame buffer (e.g., in a system memory via memory interface 180). Memory interface 180 may facilitate communications with one or more of various memory hierarchies in various embodiments.

In various embodiments, a programmable shader such as USC 160 may be coupled in any of various appropriate configurations to other programmable and/or fixed-function elements in a graphics unit. The exemplary embodiment of FIG. 1B shows one possible configuration of a graphics unit 150 for illustrative purposes.

Referring now to FIG. 1C, one embodiment of a system 181 configured to map operands to sources is shown. In the illustrated embodiment, system 181 includes operands X-Z, destination 186, mapping 188, sources 1-3, execution block 182, and result 184. The present disclosure describes various techniques for mapping operands to sources and/or mapping destinations to results.

Operands X-Z, in the illustrated embodiment, may be stored in various locations such as registers (which may include special registers not included in a register file), caches, memories, as forwarded results, etc. Operands may be data to be used for a given operation specified by an instruction.

Mapping 188, in the illustrated embodiment may allow for arbitrary mapping of operands X-Z to sources 1-3.

Sources 1-3, in the illustrated embodiment, are inputs to execution block 182. Execution block 182, in the illustrated embodiment, may be configured to perform various operations such as source 1*source 2+source 3, for example. Execution block 182 may be configured to write result 184 to a particular destination 186 based on mapping 188.

Various embodiments disclosed herein are related to processing of graphics instructions. In other embodiments, the techniques disclosed herein may be applied to processors configured to execute instructions of various instruction set architectures (ISAs), which may or may not be related to graphics processing.

Destination 186, in the illustrated embodiment, may be configured to store data generated by an operation performed by execution block 182. Mapping 188, in the illustrated embodiment, may assign result 184 to an appropriate location for destination 186.

Referring now to FIG. 2A, a diagram illustrating an exemplary embodiment of an instruction format 200 is shown. In the illustrated embodiment, instruction format 200 includes the following fields: opcode 205, destination 210, and sources 215A-N.

Opcode 205 may indicate the nature of an instruction. For example, opcode 205 may indicate an "add" instruction, an "increment" instruction, etc. Opcode 205 may also indicate a number of source and/or destination fields in a given instruction. Destination 210 may indicate a location at which a result is to be stored, e.g., a register. Sources 215A-N may indicate locations of operands for each source 215 of the instruction. For example, consider the instruction "add r1, r2, r3." In one embodiment, this instruction indicates addition of an operand from register r2 to an operand from register r3, with the result stored in register r1. For this instruction, in this embodiment, opcode 205 indicates "add," destination 210 indicates "r1," source 215A indicates "r2" and source 215B indicates "r3." In various embodiments, instruction format 200 may include any of various numbers of source and/or destination fields. In some embodiments, instructions may include additional information (not shown).

Resolving memory bank clashes and/or detecting shared operands may require significant power consumption for instruction format 200. For example, in one embodiment, USC 160 is configured to determine when bank clashes occur when reading operands from a register file. If two operands (e.g., an operand for source 215A and an operand for source 215B) are stored on the same bank of the register file, in this embodiment, USC may be configured to stall an execution pipeline while waiting for consecutive reads from the register file. In one embodiment, determining whether a bank clash occurs may be performed using a relatively small number of bits of each operand address. For example, for a register file with eight banks, a bank clash may be determined by comparing three bits of a register address.

However, stalling an execution pipeline may not be needed (and may be inefficient) when the same operand is used for more than one source, even though a bank clash would typically be indicated based on comparison of a small number of bits. For example, consider the instruction "add r1, r2, r2." For this instruction, an operand from register r2 is used for two sources, but no stall is needed because r2 can be accessed with a single register file read. However, examination of only a few bits of a source address (e.g., to determine a bank clash) cannot determine whether two source addresses are the same. Thus, identifying whether two sources address the same register may require comparing all address bits of the two sources in embodiments using instruction format 200. This comparison may consume considerable power, especially in GPUs, which typically include large numbers of registers and thus have relatively large register addresses.

Further, other elements such as a system memory may provide instruction operands. Routing operands to appropriate sources from multiple operand providers of various types may be complex. Also, if a shared operand has a large number of bits in its address, including the address twice in a given instruction may require a relatively large instruction word, which may also increase power consumption.

Referring now to FIG. 2B, a diagram illustrating an exemplary embodiment of an instruction format 220 is shown. In the illustrated embodiment, instruction format 220 includes the following fields: opcode 225, number of location values 230, destination mapping 235, source mappings 240A-N, and location values 250A-M. Instruction format 220 may be specified by a particular ISA.

Opcode 225, in one embodiment, is similar to opcode 205 as described above with reference to FIG. 2A and may identify the nature of an instruction and/or include additional information about an instruction.

Number of location values field 230, in the illustrated embodiment, indicates how many location values 250A-M are included in a given instruction. In various embodiments, a given instruction may include any number of location values, and an ISA may specify maximum number of location values for a given instruction. In some embodiments, the information of field 230 may be included in opcode 225.

Location values 250A-M, in one embodiment, include location information sufficient to read an operand and/or write a destination for a given instruction. In the illustrated embodiment, location values do not indicate to which source an operand is mapped (this information is provided by source mappings 240 in the illustrated embodiment). Consider, for example, the instruction "subtract r1, r2, r3" which indicates that operands from r2 and r3 should be provided as sources to an arithmetic logic unit (ALU). A location value 250 for r3, in this embodiment, includes information sufficient to read an operand from r3 (e.g., the address of r3). However, in this embodiment, the location value 250 does not include information indicating which input to the ALU should receive the operand from r3.

Location values 250A-M may also indicate an operand provider type. For example, in various embodiments, operands may be provided from one or more register files, one or more memories, as forwarded results, as immediate values in an instruction, from special register, etc. Depending on the provider type for an operand, location values 254A-N may include different types of information. For example, for a register file, in one embodiment, a location value 250 may include a register address which may indicate a bank and entry of the register file. As another example, in one embodiment, a location value 250 may include a memory address which may indicate a bank, row, and column of the memory. As yet another example, in one embodiment, for an immediate value included in an instruction, a location value 250 may contain the immediate value and/or indicate another field in instruction format 220 that contains all or a portion of the immediate value. As used herein, the term "immediate value" refers to a value that is included in an instruction word. For example, for the instruction "add r1, r1, #4," the value '4' may be an immediate value in the instruction and may be added to an operand from register r1.

Source mappings 240A-N, in one embodiment, indicate which operands (e.g., as indicated by location values 250) map to which source. In one embodiment, each source mapping is associated with a source and specifies a location value. Examples of such mappings are provided below with reference to FIGS. 3A-E. Source mappings 240A-N may each include a relatively small number of bits. For example, if instruction format 220 allows a maximum of eight location values 250, each source mapping 240 may include three bits. As used herein, the terms "source mapping" and "mapping value" refer to information that specifies a location value mapped to a particular source. The term "location value" refers to information that indicates the location of an operand.

Destination mapping 235, in one embodiment, specifies which location value 250 is mapped to a destination of an instruction. In some embodiments, instructions may specify multiple destinations and instruction format 220 may include multiple destination mappings. Including destination mappings may reduce instruction word size in situations in which a source and a destination share the same address, e.g., because the address can be indicated using a single location value 250. In this situation, destination mapping 235 and a source mapping 240 may specify the same source location value 250.

In various embodiments, instruction format 220 may include any of various numbers of source mappings, destination mappings, and/or location values. In some embodiments, instructions may include additional information beyond the illustrated fields.

When executing instructions that use instruction format 220, an execution pipeline may be configured not to check whether different sources require the same operand, which may reduce power consumption. For example, a compiler may form instructions such that location values 250 do not indicate the same location, which may render address comparison logic unnecessary. Further, the compiler may include multiple source mappings that specify the same location value when sources of an instruction share a given operand. Further, an execution pipeline may be designed to access at most N operands from a particular operand provider, and these N operands may be routed to N or more different source inputs. In one embodiment, N is one for a particular operand provider, such as an array of special registers, for example. In this embodiment, an execution pipeline is configured to access at most one operand from the particular operand provider for a given operation.

Figure 3A:
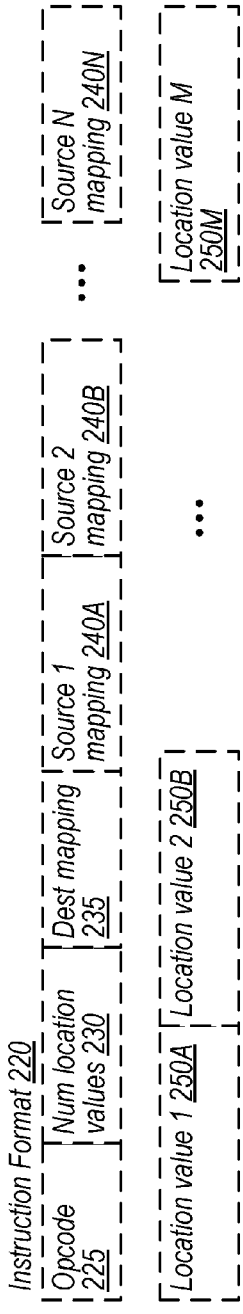

FIG. 3A re-illustrates the exemplary instruction format 220 of FIG. 2B in order to facilitate interpretation FIGS. 3B-E, which illustrate implementation of instructions using instruction format 220.

Figure 3B:
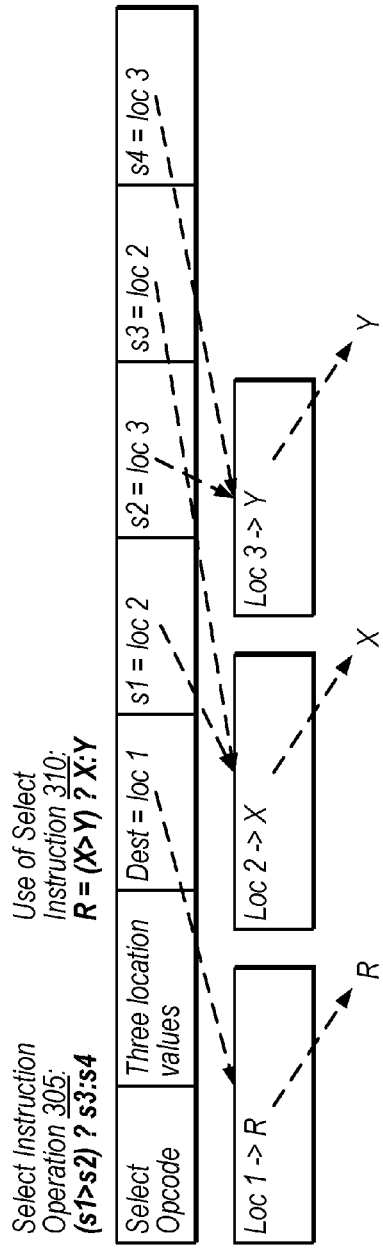

Referring now to FIG. 3B, a diagram illustrating an implementation of an exemplary select instruction 310 is shown. As shown, select instruction operation 305 indicates the nature of a select instruction, "(s1>s1) ? s3:s4". Two sources s1 and s2 are compared, and either s3 or s4 is returned based on whether s1 is greater than s2. In FIG. 3B, use of select instruction 310 shows that the select instruction is implemented as "R=(X>Y) ? X:Y" with operands X and Y and result R. This use may be described as a "max" function, in which the greater of X and Y is returned.

In the illustrated example, the opcode indicates the "select" instruction. In this example, the number of location values 230 is three. In this example, destination mapping 235 specifies location value 1 and location value 1 indicates the location R at which to store a result. In this example, source mappings for sources s1 and s3 specify location value 2 and location value 2 indicates the location of operand X. Similarly, in this example, source mappings for sources s2 and s4 specify location value 3 and location value 3 indicates the location of operand Y.

In the illustrated example, because sources s1 and s3 share location value 2, no comparison of addresses for operands for s1 and s3 is necessary and a single read may be performed to provide the same operand for both sources.

The technique of FIG. 3B may generally be described as utilizing two pointers to map an operand to a source. The source mapping 240 may be referred to as a source pointer, and points to a location value 250 for a source. Similarly, the location value 250 may be referred to as a location pointer, and points to a location of an operand for the source. FIG. 3B shows that a given instruction may have different numbers of source mappings 240 and location values 250 (e.g., when multiple sources mappings 240 point to the same location value).

Figure 3C:
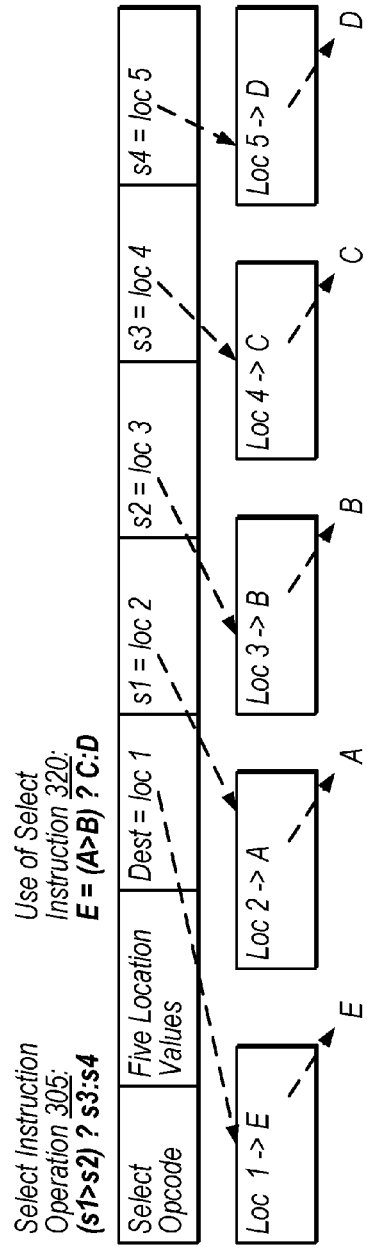

Referring now to FIG. 3C, a diagram illustrating another exemplary implementation of a select instruction 320 is shown. In FIG. 3C, use of select instruction 320 shows that the select instruction is implemented as "E=(A>B) ? C:D" with operands A-D and result E.

In this example, destination mapping 235 specifies location value 1 and location value 1 indicates the location E at which to store a result. In this example, source mappings for sources s1-s4 each specify one of location values 1-4, which in turn indicate the locations of operands A-D. In contrast to FIG. 3B, in the illustrated example of FIG. 3C, none of the source mappings 240 point to the same location value.

For the exemplary instructions of FIGS. 3B and 3C, an execution pipeline may be configured to determine whether bank clashes occur for location values 250.

Referring now to FIG. 3D, a diagram illustrating an exemplary implementation of an increment instruction 330 is shown. As shown, increment instruction operation 325 indicates the nature of an increment instruction, "s1=s2++". A source s2 is incremented and the result is stored in source s1. In FIG. 3D, use of increment instruction 330 shows that the increment instruction is implemented as "X=X++" with operand X and result X.

In the illustrated example, the destination mapping and source mapping both specify location value 1. In this example, location value 1 indicates the location from which to read operand X and to store incremented result X. Thus, in some embodiments, destination mappings and source mappings may specify the same location value.

Referring now to FIG. 3E, a diagram illustrating an exemplary implementation of another increment instruction 340 is shown. In FIG. 3E, use of increment instruction 330 shows that the increment instruction is implemented as "X=Y++" with operand Y and result X. Thus, in the example of FIG. 3E, the destination mapping and the source mapping for s1 specify different location values which in turn identify different locations X and Y.

Figure 4:
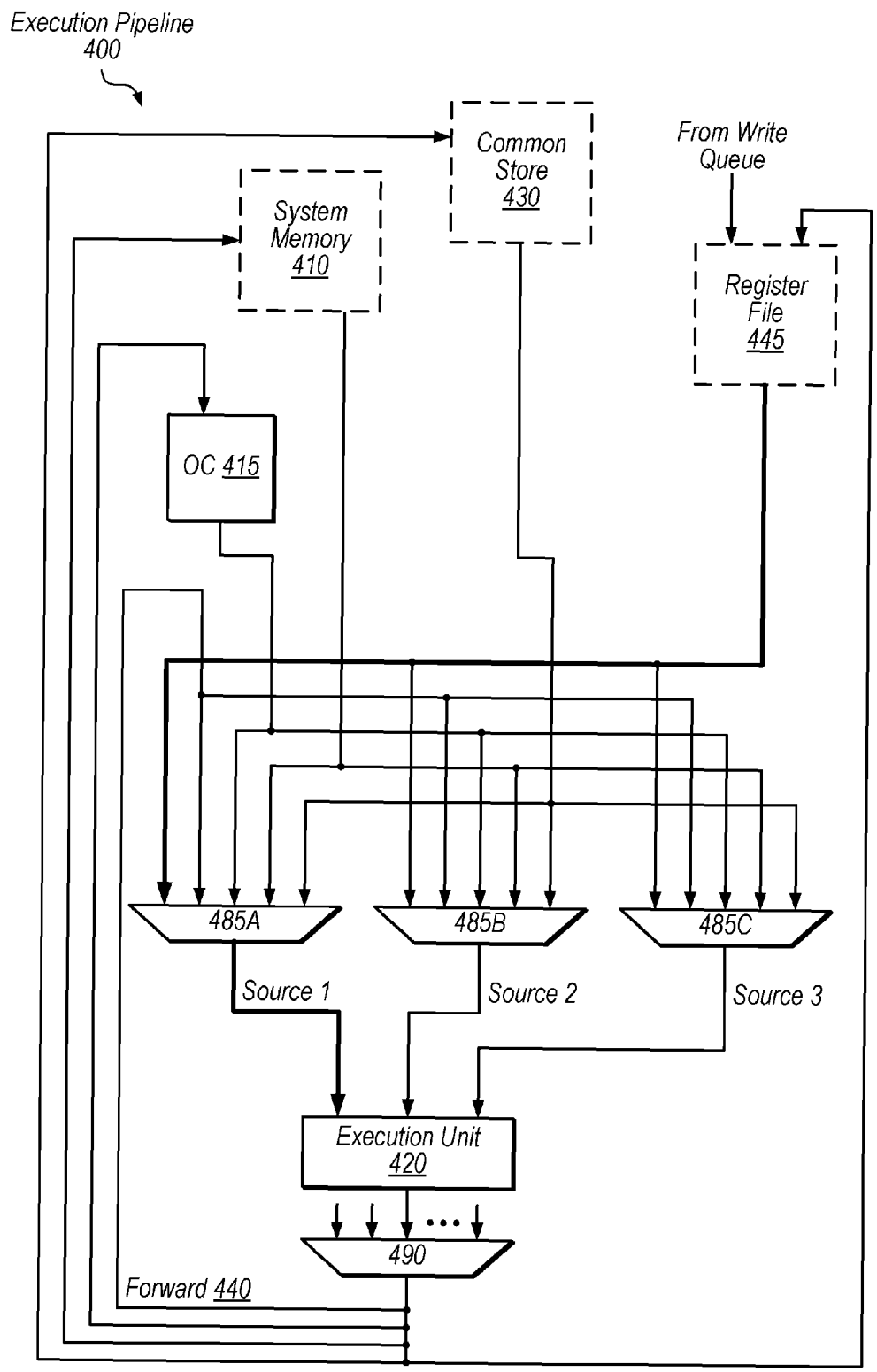
FIG. 4 is a block diagram illustrating one embodiment of an execution pipeline.

Referring now to FIG. 4, a block diagram illustrating one embodiment of an execution pipeline 400 is shown. In the illustrated embodiment, execution pipeline 400 includes system memory 410, common store 430, register file 445, operand cache 415, execution unit 420, multiplexors (MUXs) 485A-C, and output MUX 490. In the illustrated embodiment, various elements are outlined using dashed lines to indicate that they may not be included in execution pipeline 400 but may reside in other parts of USC 160, for example. In one embodiment, execution pipeline 400 is configured to process instructions specified using instruction format 220. The bold pathway from register file 445 to source 1 in the illustrated embodiment is emphasized for illustrative purposes and is discussed below with reference to MUXs 485.

Execution unit 420, in the illustrated embodiment, is configured to perform an operation using one or more of sources 1-3 and send a result to output MUX 490. The operation may be specified by the opcode 205 of a given instruction. In other embodiments, execution unit 420 may be configured to perform operations using other numbers of sources such as 2, 4, 5, etc. Execution unit 420, in one embodiment, is an execution block that includes multiple execution units configured to perform various operations. Execution unit 420 may be configured to perform various operations such as add, subtract, multiply, multiply-add, etc. In the illustrated embodiment, execution unit 420 is configured to produce a result that may be forwarded or written to various elements of execution pipeline 400, as will be discussed in further detail below.

USC 160, in one embodiment, includes a number of execution pipelines 400. Register file 445, in one embodiment, may be configured to store registers for a portion of these pipelines, such as 4 or 8 pipelines, for example. Register file 445, in one embodiment, includes a plurality of banks, and each bank includes registers for multiple execution pipelines.

Common store 430, in one embodiment, is accessible to all execution pipelines in USC 160 and may be used for additional storage when an execution pipeline needs more storage than is available in its associated register file 445, for example. Common store may be a random access memory, in one embodiment, and may be relatively large compared to register file 445.

In one embodiment, an execution pipeline may also access system memory 410, e.g., to fetch vertex or fragment data. In other embodiments, system memory 410 may not be directly accessible by an execution unit 420, but may provide data for common store 430 and/or register file 445.

Operand cache 415, in one embodiment, is configured to cache operands for a particular execution pipeline 400. Register file 445 and/or execution unit 420 may provide operands to operand cache 415, for example. Operand cache 415 may reduce power consumption in accessing operands that have been recently used or generated. In one embodiment, operands that are present in operand cache 415 are not accessed from other operand providers because accessing operand cache 415 is more power efficient.

In other embodiments, additional operand providers in addition to common store 430, system memory 410, register file 445, and operand cache 415 may be included in USC 160 and/or one or more of the illustrated operand providers may be omitted.

In one embodiment, operands may be provided as immediate operands in an instruction word. A location value field may indicate a location of an immediate operand in the instruction. The immediate operand may be included in a location value field and/or other fields of the instruction. A routing pathway for immediate operands is not shown in the illustrated embodiment. In one embodiment, immediate operands may be separately provided to MUXs 485, similarly to operands from other providers. In one embodiment, immediate operands may be provided on one of the illustrated pathways, e.g., the pathway from common store 430. In this embodiment, an ISA may specify that a given instruction cannot include both an immediate operand and an operand from the operand provider sharing the pathway.

In the illustrated embodiment, operands are also available as forwarded results from execution unit 420, via forward signal 440. Execution pipeline 400 may be configured to use forwarded results as operands rather than accessing operands from other operand providers in order to avoid stalling while waiting for operands, for example.

In one embodiment, execution pipeline 400 is configured to access operands based on one or more location values 250 in a given instruction. For example, in one embodiment, a location value 250 may indicate a location in system memory 410, in common store 430, or in register file 445. In one embodiment, a location value 250 may also indicate which type of operand provider is indicated. Execution pipeline 400, in one embodiment, may read operands from operand cache 415 and/or forward signal 440 instead of an indicated operand provider in response to determining that the indicated operand is available from operand cache 415 or forward signal 440. In the illustrated embodiment, operands accessed for a given instruction are provided to each of MUXs 485.

MUXs 485A-C, in the illustrated embodiment, are configured to route an operand from the various operands accessed as described above, to one or more of the source inputs to execution unit 420. In one embodiment, MUXs 485 are configured to select one of their inputs based on source mapping information in a given instruction. For example, if a source mapping for source 1 specifies a location value that indicates an operand in a register of register file 445, MUX 485A may be configured to select the input from register file 445. This particular path is illustrated in bold in FIG. 3 for illustrative purposes. MUXs 485A-C may include multiple inputs for a given operand provider, in some embodiments. In various embodiments, various selection logic implementations may be configured to map accessed operands to source inputs based on source mapping information.

Output MUX 490, in the illustrated embodiment, is configured to provide a result from execution unit 420 to a destination. In the illustrated embodiment, output MUX 490 is configured to select from a number of inputs, e.g., from other execution units, floating-point units, shift units, etc. that may be included in execution pipeline 400. In the illustrated embodiment, the output of MUX 490 is routed to multiple destinations. Execution pipeline 400, in one embodiment, may be configured to write a result to one of system memory 410, common store 430, or register file 445 based on a location value 250 specified by the destination mapping 234. In other embodiments, execution unit 420 may be configured to produce multiple results, which may be routed to various elements of execution pipeline 400 based on similar instruction fields.

In one embodiment, execution pipeline 400 is configured to read at most a certain number of operands from a given operand provider (e.g., N operands). For example, in one embodiment, execution pipeline 400 is configured to read at most a single operand from common store 430 for a given instruction. This may simplify routing to MUXs 485 while still allowing an operand to be provided to multiple sources, e.g., when multiple source mapping values 240 specify the same location value 250.

In various embodiments, elements of execution pipeline 400 may be rearranged or omitted and additional elements may be added. Execution pipeline 400 is one exemplary embodiment of an execution pipeline configured to process instructions specified using instruction format 220. In other embodiments, other configurations of pipelines may process instructions of various formats that include similar features such as location values and source mapping information.

Embodiments in which execution pipeline 400 is configured to process instructions specified according to instruction format 220 may reduce power consumption, e.g., because execution pipeline 400 may not include comparison circuitry for determining whether an operand is shared between multiple sources. This functionality may be facilitated by the instruction including a single location value for each operand. Execution pipeline 400 may be configured to detect bank clashes between location values 250 without comparing all of the bits of a given pair of operand addresses.

Figure 5:
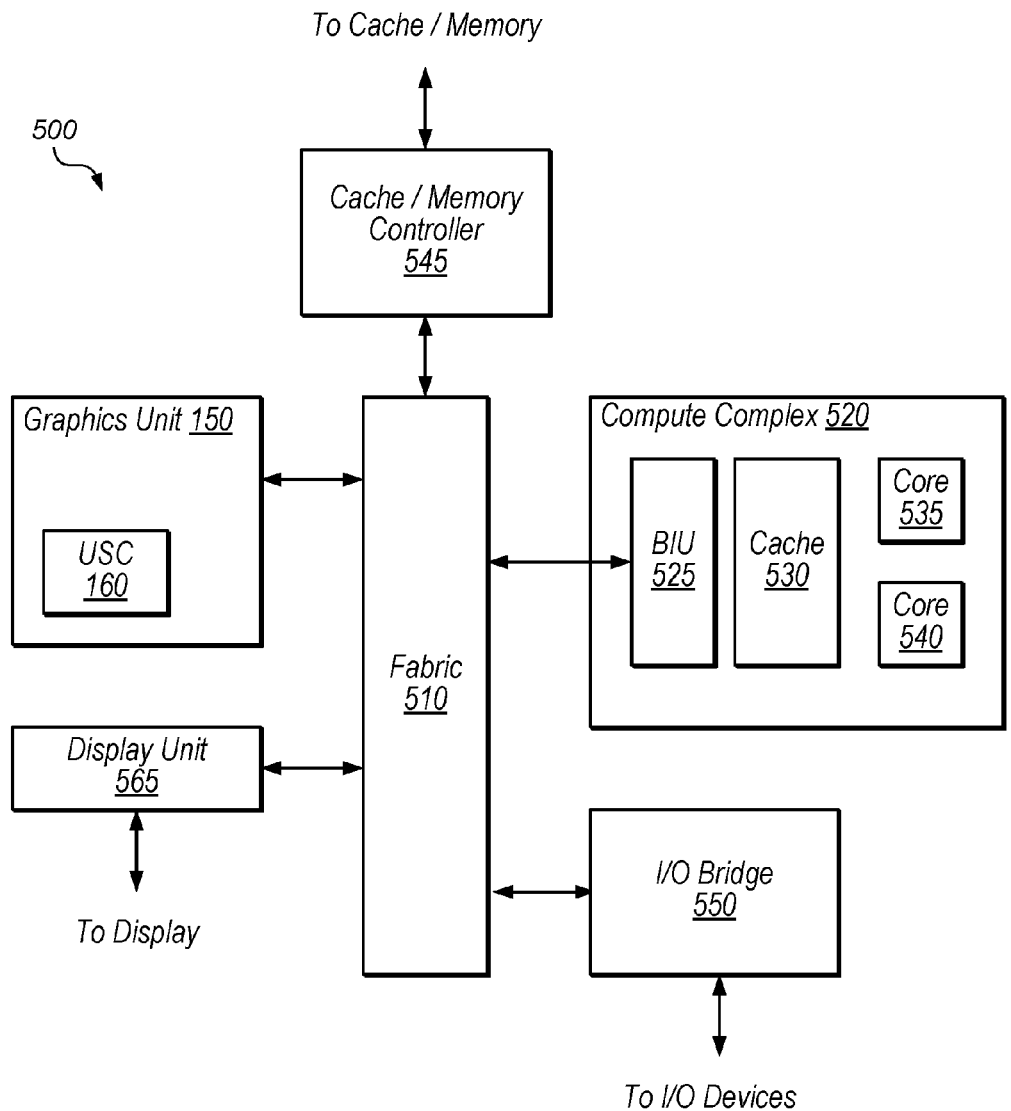
FIG. 5 is a block diagram illustrating one embodiment of a device that includes a graphics unit.

Referring now to FIG. 5, a block diagram illustrating an exemplary embodiment of a device 500 is shown. In some embodiments, elements of device 500 may be included within a system on a chip. In some embodiments, device 500 may be included in a mobile device, which may be battery-powered. Therefore, power consumption by device 500 may be an important design consideration. In the illustrated embodiment, device 500 includes fabric 510, compute complex 520, input/output (I/O) bridge 550, cache/memory controller 545, graphics unit 150, and display unit 565.

Fabric 510 may include various interconnects, buses, MUX's, controllers, etc., and may be configured to facilitate communication between various elements of device 500. In some embodiments, portions of fabric 510 may be configured to implement various different communication protocols. In other embodiments, fabric 510 may implement a single communication protocol and elements coupled to fabric 510 may convert from the single communication protocol to other communication protocols internally.

In the illustrated embodiment, compute complex 520 includes bus interface unit (BIU) 525, cache 530, and cores 535 and 540. In various embodiments, compute complex 520 may include various numbers of cores and/or caches. For example, compute complex 520 may include 1, 2, or 4 processor cores, or any other suitable number. In one embodiment, cache 530 is a set associative L2 cache. In some embodiments, cores 535 and/or 540 may include internal instruction and/or data caches. In some embodiments, a coherency unit (not shown) in fabric 510, cache 530, or elsewhere in device 500 may be configured to maintain coherency between various caches of device 500. BIU 525 may be configured to manage communication between compute complex 520 and other elements of device 500. Processor cores such as cores 535 and 540 may be configured to execute instructions of a particular ISA which may include operating system instructions and user application instructions.

Cache/memory controller 545 may be configured to manage transfer of data between fabric 510 and one or more caches and/or memories. For example, cache/memory controller 545 may be coupled to an L3 cache, which may in turn be coupled to a system memory. In other embodiments, cache/memory controller 545 may be directly coupled to a memory. In some embodiments, cache/memory controller 545 may include one or more internal caches.

As used herein, the term "coupled to" may indicate one or more connections between elements, and a coupling may include intervening elements. For example, in FIG. 5, graphics unit 150 may be described as "coupled to" a memory through fabric 510 and cache/memory controller 545. In contrast, in the illustrated embodiment of FIG. 5, graphics unit 150 is "directly coupled" to fabric 510 because there are no intervening elements.

Graphics unit 150 may be configured as described above with reference to FIGS. 1B and 4. Graphics unit 150 may include one or more processors and/or one or more graphics processing units (GPU's). Graphics unit 150 may receive graphics-oriented instructions, such OPENGL® or DIRECT3D® instructions, for example. Graphics unit 150 may execute specialized GPU instructions or perform other operations based on the received graphics-oriented instructions. Graphics unit 150 may generally be configured to process large blocks of data in parallel and may build images in a frame buffer for output to a display. Graphics unit 150 may include transform, lighting, triangle, and/or rendering engines in one or more graphics processing pipelines. Graphics unit 150 may output pixel information for display images. In the illustrated embodiment, graphics unit 150 includes USC 160.

Display unit 565 may be configured to read data from a frame buffer and provide a stream of pixel values for display. Display unit 565 may be configured as a display pipeline in some embodiments. Additionally, display unit 565 may be configured to blend multiple frames to produce an output frame. Further, display unit 565 may include one or more interfaces (e.g., MIPI® or embedded display port (eDP)) for coupling to a user display (e.g., a touchscreen or an external display).

I/O bridge 550 may include various elements configured to implement: universal serial bus (USB) communications, security, audio, and/or low-power always-on functionality, for example. I/O bridge 550 may also include interfaces such as pulse-width modulation (PWM), general-purpose input/output (GPIO), serial peripheral interface (SPI), and/or inter-integrated circuit (I2C), for example. Various types of peripherals and devices may be coupled to device 500 via I/O bridge 550.

Figure 6:
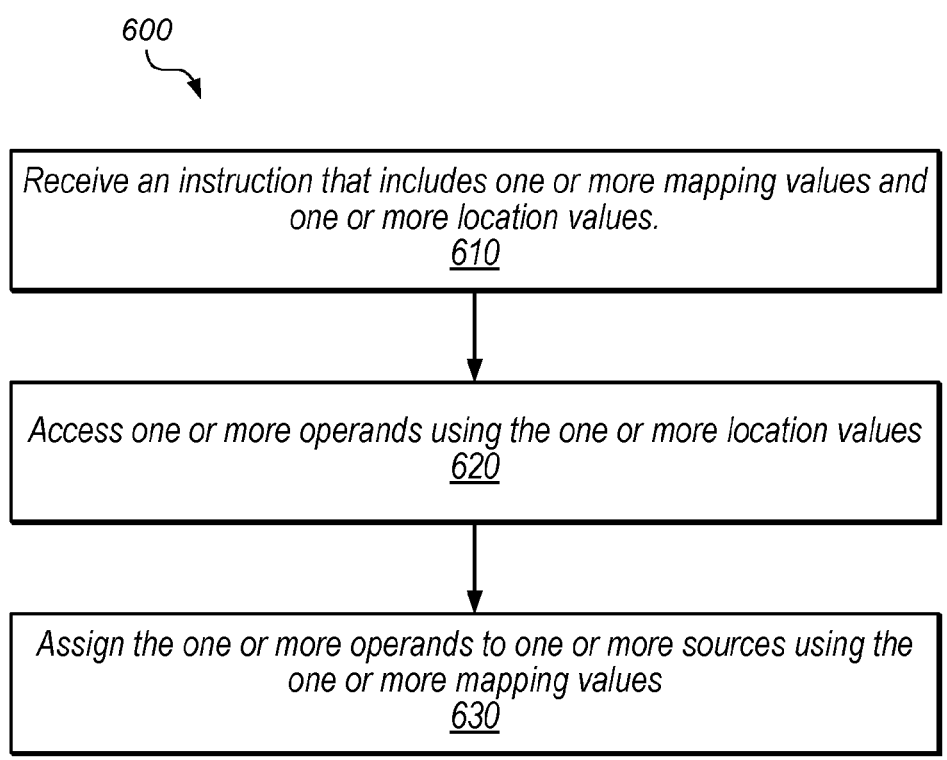
FIG. 6 is a flow diagram illustrating one embodiment of a method for assigning operands to sources.

Referring now to FIG. 6, a flow diagram illustrating one exemplary embodiment of a method 600 for assigning operands to sources is shown. The method shown in FIG. 6 may be used in conjunction with any of the computer systems, devices, elements, or components disclosed herein, among other devices. In various embodiments, some of the method elements shown may be performed concurrently, in a different order than shown, or may be omitted. Additional method elements may also be performed as desired. Flow begins at block 610.

At block 610, an instruction is received that includes one or more mapping values and one or more location values. In one embodiment, each of the one or more mapping values corresponds to one of one or more sources. In one embodiment, each mapping value specifies one of the one or more location values. In one embodiment, each of the one or more location values is usable to identify one of the one or more operands. In one embodiment, the received instruction may be specified using instruction format 220. Flow proceeds to block 620.

At block 620, one or more operands are accessed using the one or more location values. In various embodiments, operands may be accessed from a register file, a common store, a memory, an operand cache, as a forwarded result, and/or as an immediate value. In other embodiments, operands may be accessed from other types of operand providers. Flow proceeds to block 630.

At block 630, the one or more operands are assigned to one or more sources using the one or more mapping values. In one embodiment, each mapping value points to a location value and each location value points to an operand. In one embodiment, instruction results may be assigned to destinations based on a destination mapping that specifies a location value that indicates a location at which to store the result. Flow ends at block 630.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. An apparatus, comprising:
   execution circuitry configured to generate one or more output results based on one or more operands provided via a plurality of source inputs to the execution circuitry; and
   operand access circuitry configured to:
      determine one or more locations of one or more operands for an operation to be performed by the execution circuitry, based on location information;
      access the one or more operands from the determined one or more locations; and
      assign the one or more operands to ones of the plurality of source inputs based on mapping information that maps ones of the ones or more operands to ones of the plurality of source inputs.

2. The apparatus of claim 1, wherein the location information and the mapping information are included in an instruction that specifies the operation to be performed by the execution circuitry.

3. The apparatus of claim 1, wherein the apparatus is configured to store an execution result at a location specified by location information, wherein the location information is specified by destination mapping information.

4. The apparatus of claim 3, wherein the destination mapping information and the mapping information specify the same location for one of the one or more operands and the execution result.

5. The apparatus of claim 1, wherein the mapping information maps at least one of the operands to two or more source inputs.

6. The apparatus of claim 1, wherein the location information indicates a provider of one of the one or more operands.

7. The apparatus of claim 6, wherein the provider is selected from a set of providers that includes two of more of: a register, a cache, a memory, or immediate operand circuitry.

8. A method, comprising:
   compiling a computer program to generate output instructions that include at least one instruction that includes:

information specifying an operation to be performed by execution circuitry;

one or more location values that specify the location of one or more input operands for the instruction; and a plurality of mapping values that each specify an assignment of one of the one or more input operands to a particular one of a plurality of source inputs for the operation.

9. The method of claim 8, wherein the at least one instruction further includes a destination mapping value that specifies that a result of the instruction is to be stored at a location specified by one of the one or more location values.

10. The method of claim 9, wherein the destination mapping value and one of the one or more mapping values specify the same location value.

11. The method of claim 8, wherein the at least one instruction includes at least two mapping values that specify the same location value.

12. The method of claim 8, wherein the at least one instruction includes information that specifies a number of location values included in the instruction.

13. The method of claim 8, wherein one of the one or more location values indicates that it includes an immediate operand.

14. The method of claim 8, wherein at least one of the one or more location values indicates a provider of one of the one or more input operands, wherein the provider is selected from a set of providers that includes two or more of: a register, a cache, a memory, and an immediate operand.

15. A non-transitory computer-readable medium having instructions stored thereon that are executable by a computing device to perform one or more operations, wherein at least one of the instructions includes:

information specifying an operation to be performed by execution circuitry;

one or more location values that specify the location of one or more input operands for the instruction; and a plurality of mapping values that each specify an assignment of one of the one or more input operands to a particular one of a plurality of source inputs for the operation.

16. The non-transitory computer-readable medium of claim 15, wherein the at least one instruction further includes a destination mapping value that specifies that a result of the instruction is to be stored at a location specified by one of the one or more location values.

17. The non-transitory computer-readable medium of claim 16, wherein the destination mapping value and one of the one or more mapping values specify the same location value.

18. The non-transitory computer-readable medium of claim 15, wherein the at least one instruction includes at least two mapping values that specify the same location value.

19. The non-transitory computer-readable medium of claim 15, wherein the at least one instruction includes information that specifies a number of location values included in the instruction.

20. The non-transitory computer-readable medium of claim 15, wherein a location value indicates a provider of one of the one or more input operands, wherein the provider is selected from a set of providers that includes two or more of: a register, a cache, a memory, and an immediate operand.

* * * * *